Patented May 15, 1951

2,552,820

UNITED STATES PATENT OFFICE 2,552,820

CELLULOSE ESTERS

George W. Seymour, Maplewood, Blanche B. White and Leonard J. Rosen, Summit, and Leon Kruth, East Orange, N. J., assignors to Celanese Corporation of America, a corporation of Delaware No Drawing. Application October 13, 1948, Serial No. 54,356

4 Claims. (Cl. 260—229)

This invention relates to the preparation of mixed organic acid esters of cellulose and relates more particularly to an improved process for the production of mixed organic acid esters of cellulose containing lower aliphatic acid acyl groups and higher aliphatic acid acyl groups.

An object of this invention is the provision of an improved process for the production of mixed organic acid esters of cellulose.

Another object of this invention is the production in a rapid and efficient manner of mixed organic acid esters containing a relatively high proportion of higher aliphatic acid acyl groups whereby mixed esters of a high degree of stability and high degree of polymerization are obtained.

Other objects of this invention will appear from the following detailed description.

Various methods have been proposed for the production of mixed organic acid esters of cellulose containing the acyl groups of both higher and lower aliphatic acids. In order to form mixed organic acid esters of cellulose containing a desirably high proportion of the higher acyl groups not only are high catalyst concentrations utilized but the reaction mixture employed for the esterification usually contains a substantial excess of the higher acyl groups. To produce a fully esterified cellulose ester the reaction is usually conducted for a prolonged period of time at moderate temperatures or shorter periods may be employed at more elevated temperatures. Not only is such a process uneconomical since the acids or anhydrides containing the higher acyl groups are relatively costly, but the use of high catalyst concentrations, and a prolonged reaction period or elevated reaction temperatures have a degrading effect on the cellulose chain length thus yielding mixed cellulose esters of a low degree of polymerization and of a lower average molecular weight.

We have now found that mixed organic acid esters of cellulose of improved physical characteristics may be obtained by pretreating cellulose with a mixture comprising a lower aliphatic acid preferably in an amount no greater than the weight of the cellulose and containing all of the esterification catalyst to be employed, esterifying the pretreated cellulose by subjecting the same to the action of an anhydride of an aliphatic acid higher in carbon content than the said lower aliphatic acid in admixture with an inert solvent for the cellulose ester formed, the higher aliphatic acid anhydride being employed, preferably, in an amount of no more than about three parts by weight for each part by weight of cellulose. Then, after the initial esterification reaction is substantially completed and the esterification reaction mixture has reached peak reaction temperature, there is added to the reaction mixture the anhydride of the lower aliphatic acid employed for the pretreatment and the reaction is continued until the reaction mixture is substantially clear of unreacted cellulose fibers. The esterification, in accordance with our novel process, takes place rapidly under relatively mild reaction conditions and yields mixed cellulose esters containing a high proportion of the higher acyl groups. The mixed esters formed may then be ripened, if desired, in the usual manner to the desired acyl value and solubility characteristics. The mixed esters obtained by our novel process are of satisfactory stability and degree of polymerization and are eminently suitable for the usual textile and plastic applications.

While our novel process may be employed for the production of mixed organic acid esters of cellulose, such as, for example, cellulose acetate-propionate, cellulose acetate-butyrate, cellulose propionate-butyrate, cellulose acetate-acrylate, cellulose acetate-methacrylate and cellulose propionate-crotonate, it will be more particularly described in connection with the production of cellulose acetate-crotonate.

In forming cellulose acetate-crotonate in accordance with the novel process of our invention, cellulose in the form of wood pulp, cotton linters, or purified cellulose in any other form is pretreated for ¼ to 2 hours at 15° to 30° C. with not more than about an equal weight of acetic acid with or without an inert diluent containing 1 to 10% on the weight of the cellulose of an esterification catalyst, such as sulfuric acid. The catalyst employed in the pretreatment is all of the catalyst employed for esterification. The pretreatment renders the cellulose more reactive for esterification. After pretreatment, the pretreated cellulose is cooled, preferably to about —10° to 15° C. and the activated cellulose is then esterified by reacting the same with from about 1.5 to about 3 parts by weight on the weight of the cellulose of crotonic acid anhydride in admixture with an inert solvent for the cellulose ester formed. The mixture of crotonic acid anhydride and inert solvent is cooled to about —5° to 15° C. prior to reaction with the activated cellulose. While we preferably employ nitromethane as the inert solvent during esterification or the inert diluent, when present, during the pretreatment, other solvents which may be employed are, for example, chlorbenzene, nitroethane, nitropropane, nitrobenzene and methylene chloride.

After the addition of the crotonic anhydride and inert diluent, the temperature of the reaction mixture is permitted to rise freely without any external cooling until the peak temperature is reached, which temperature is usually about 25° to 40° C. The reaction mixture is allowed to remain at peak temperature for about 15 to 25 minutes and then 1 to 3 parts by weight on the weight of the cellulose of acetic anhydride are added, the acetic anhydride being cooled to about 0° to 10° C. prior to the addition. Further esterification takes place upon the addition of the acetic anhydride and external cooling may be employed, but only to the extent necessary to keep the temperature from rising above about 40° C. Reaction is complete when the reaction mixture is substantially free of unreacted fibers. A substantially completely esterified cellulose is easily obtained with a total reaction time of only from 1.5 to 7 hours.

The primary cellulose acetate-crotonate is separated from solution by cooling the esterification mixture to about 25° C. adding sufficient water, as aqueous acetic acid, to hydrolyze all of the unreacted acetic and crotonic anhydride, neutralizing the acid catalyst with an excess of aqueous sodium carbonate and then precipitating the cellulose acetate-crotonate from solution by the addition thereto of an excess of water. Advantageously, the neutralized solution may be diluted with an equal volume of acetone prior to precipitation so that, on precipitation, the cellulose acetate-crotonate will be precipitated as a soft fiber. If desired, the cellulose acetate-crotonate may be ripened prior to precipitation to yield a cellulose acetate-crotonate having some free hydroxyl groups. Ripening of the primary cellulose acetate-crotonate may be effected prior to the neutralization of the catalyst by adding to the solution water in an amount sufficient not only to effect ripening of the ester but also to hydrolyze any unreacted anhydrides and then heating the reaction mixture to a temperature of 35 to 85° C. until the desired degree of hydrolysis has taken place. The ripened cellulose acetate-crotonate obtained may be precipitated from solution in the manner described above.

In order further to illustrate our invention, but without being limited thereto, the following examples are given:

Example I 100 parts by weight of cotton linters are pretreated by adding thereto a mixture of 100 parts by weight of glacial acetic acid containing 3 parts by weight of sulfuric acid, and stirring the mixture for about two hours at a temperature of 25° C. The pretreated cotton linters are cooled to a temperature of about 7° C. and a mixture of 300 parts by weight of crotonic anhydride and 300 parts by weight of nitromethane cooled to about 5° C. is then added thereto. The temperature of the reaction mixture is allowed to rise and reaches a peak temperature of 36° C. after the esterification has proceeded for about 15 minutes. The esterification reaction is permitted to proceed for an additional 25 minutes and then 150 parts by weight of acetic anhydride cooled to 10° C. are added thereto over about 15 minutes. The reaction mixture is cooled following the addition of the acetic anhydride but only enough to prevent the temperature from rising above about 38° C. The esterification reaction is continued for an additional 80 minutes at which time the reaction mixture is clear and substantially free of unesterified fibers. The mixture is then cooled to 25° C. and unreacted anhydride hydrolyzed by the addition thereto of a sufficient amount of cold aqueous acetic acid. A portion of the reaction mixture is separated and the sulfuric acid catalyst present is neutralized by adding an excess of aqueous sodium carbonate. Acetone in an amount equal in volume to the neutralized reaction mixture is then added to thin out the primary solution and the cellulose acetate-crotonate precipitated from solution by the addition of an excess of water thereto. The cellulose acetate-crotonate obtained contains 1.01 crotonyl groups, 1.88 acetyl groups and 0.11 free hydroxyl groups per glucose residue. The cellulose acetate-crotonate has a stability of 0.19% as acetic acid and a viscosity of 77 centipoises. The stability is determined by titration of acidic components, calculated as acetic acid, of an aqueous suspension of three grams of the cellulose ester in 100 ml. of neutral distilled water following a five hour digestion in an autoclave at 20 p. s. i. The titration of the acetic acid liberated by hydrolysis is done with .01 N caustic soda using phenolphthalein as the indicator. The acidity developed is calculated as percent acetic acid based on the cellulose ester sample used.

When the remaining portion of the reaction mixture is ripened at 60° C. for about 4 hours, the cellulose acetate-crotonate obtained contains 1.01 crotonyl groups, 1.73 acetyl groups and 0.27 free hydroxyl groups per glucose residue and has a stability of 0.10% as acetic acid and a viscosity of 67.

Example II 100 parts by weight of cotton linters are pretreated by adding a mixture of 100 parts by weight of glacial acetic acid and 2.5 parts by weight of sulfuric acid thereto and stirring the mixture for about 2 hours at a temperature of 25° C. The pretreated cotton linters are cooled to a temperature of about 7° C. and a mixture of 300 parts by weight of butyric acid anhydride and 300 parts by weight of nitromethane cooled to about 5° C. are then added thereto. The temperature of the reaction mixture is allowed to rise to a peak of 31° C. which is reached after the esterification has proceeded for 20 minutes and after an additional 20 minutes 150 parts by weight of acetic anhydride cooled to 10° C. are added thereto over the course of about 15 minutes. The temperature of the reaction mixture is maintained below about 39° C. and the esterification continued for an additional 105 minutes or a total of 160 minutes. A clear reaction mixture is obtained at this time, which mixture is substantially free of unesterified fibers. The esterification reaction mixture is then cooled to 25° C. and any unreacted anhydride present hydrolyzed by the addition thereto of a sufficient amount of water in the form of a cold aqueous acetic acid solution. The sulfuric acid catalyst present is neutralized by adding an excess of aqueous sodium carbonate thereto and the neutralized reaction mixture is diluted with an equal volume of acetone. The primary cellulose acetate-butyrate in solution is then precipitated from solution by the addition of an excess of water thereto. The cellulose acetate-butyrate obtained contains 0.23 free hydroxyl groups, 1.47 acetyl groups and 1.30 butyryl groups per glucose residue and has a stability of 0.4%.

*Example III*

100 parts by weight of cotton linters are pretreated by adding a mixture of 100 parts by weight of glacial acetic acid and 2.5 parts by weight of sulfuric acid thereto and stirring the mixture for about 2 hours at a temperature of 25° C. The pretreated cotton linters are cooled to a temperature of about 7° C. and a mixture of 300 parts by weight of propionic anhydride and 300 parts by weight of nitromethane cooled to about 5° C. are then added thereto. The temperature of the reaction mixture is allowed to rise to a peak of 37° C. which is reached after the esterification has proceeded for 35 minutes. The reaction is permitted to proceed for an additional 5 minutes and then 150 parts by weight of acetic anhydride cooled to 10° C. are added thereto over the course of about 15 minutes. The temperature of the reaction mixture is maintained below about 37° C. and the esterification continued for an additional 60 minutes. A clear reaction mixture is obtained at this time, which mixture is substantially free of unesterified fibers. The esterification reaction mixture is then cooled to 25° C. and any unreacted anhydride present hydrolyzed by the addition of a sufficient amount of water in the form of a cold aqueous acetic acid solution thereto. The sulfuric acid catalyst present is neutralized by the addition thereto of an excess of aqueous sodium carbonate. The neutralized reaction mixture is then diluted with an equal volume of acetone and the cellulose acetate-propionate in solution precipitated by the addition of an excess of water thereto. The cellulose acetate-propionate obtained contains 0.07 free hydroxyl groups, 1.45 acetyl groups and 1.48 butyryl groups per glucose residue and has a stability of 0.4% and a viscosity of 118.

*Example IV*

100 parts by weight of cotton linters are pretreated by adding thereto a mixture of 25 parts by weight of glacial acetic acid, 5 parts by weight of sulfuric acid, and 75 parts by weight of nitromethane, and stirring the mixture for about two hours at a temperature of 25° C. The pretreated cotton linters are cooled to a temperature of about 11° C. and a mixture of 300 parts by weight of crotonic anhydride and 300 parts by weight of nitromethane cooled to about 5° C. is then added thereto. The temperature of the reaction mixture is allowed to rise and reaches a peak temperature of 40° C. after the esterification has proceeded for about 30 minutes. The esterification reaction is permitted to proceed for an additional 10 minutes and then 150 parts by weight of acetic anhydride cooled to 10° C. are added thereto over about 15 minutes. The reaction mixture is cooled following the addition of acetic anhydride but only enough to prevent the temperature from rising above about 38° C. The esterification reaction is continued for an additional 95 minutes at which time the reaction mixture is clear and substantially free of unesterified fibers. The mixture is then cooled to 25° C. and unreacted anhydride hydrolyzed by the addition thereto of a sufficient amount of cold aqueous acetic acid. The catalyst present is neutralized by adding an excess of aqueous sodium carbonate. Acetone in an amount equal in volume to the neutralized reaction mixture is then added to thin out the primary solution and the cellulose acetate-crotonate precipitated from solution by addition of an excess of water thereto. The cellulose acetate-crotonate obtained contains 1.80 crotonyl groups, 1.10 acetyl groups, and 0.10 free hydroxyl groups per glucose residue.

It is to be understood that the foregoing detailed description is given merely by way of illustration and that many variations may be made therein without departing from the spirit of our invention.

Having described our invention, what we desire to secure by Letters Patent is:

1. Process for the production of cellulose acetate-crotonate of relatively high crotonyl value, which comprises pretreating cellulose with acetic acid in an amount no greater than the weight of the cellulose containing all of the sulfuric acid esterification catalyst employed for the esterification reaction, esterifying the pretreated cellulose by reacting the same with about three parts by weight on the weight of the cellulose of crotonic acid anhydride in admixture with an inert solvent for cellulose acetate-crotonate and, after the reaction mixture has reached peak temperature and the initial esterification is substantially completed, adding about one and one-half parts by weight on the weight of the cellulose of acetic anhydride to the esterification reaction mixture, and continuing the esterification until the reaction mixture is substantially clear of unreacted cellulose.

2. Process for the production of cellulose acetate-crotonate of relatively high crotonyl value, which comprises pretreating cellulose with acetic acid in an amount no greater than the weight of the cellulose containing all of the sulfuric acid esterification catalyst employed for the esterification reaction, esterifying the pretreated cellulose by reacting the same with about three parts by weight on the weight of the cellulose of crotonic acid anhydride in admixture with about three parts by weight on the cellulose of nitromethane and, after the reaction mixture has reached peak temperature and the initial esterification is substantially completed, adding about one and one-half parts by weight on the weight of the cellulose of acetic anhydride to the esterification reaction mixture, and continuing the esterification at a temperature no greater than about 40° C. until the reaction mixture is substantially clear of unreacted cellulose.

3. Process for the production of cellulose acetate-crotonate of relatively high crotonyl value, which comprises pretreating 100 parts by weight of cellulose with a mixture of about 25 parts by weight of glacial acetic acid, about 5 parts by weight of sulfuric acid and about 75 parts by weight of nitromethane at a temperature of about 25° C., cooling the resulting mixture to a temperature of about 11° C., adding thereto a mixture of about 300 parts by weight of crotonic acid anhydride and about 300 parts by weight of nitromethane cooled to about 5° C., allowing the temperature to rise to a peak temperature of about 40° C., permitting the esterification to proceed for a short period of time, then adding about 150 parts by weight of acetic anhydride cooled to about 10° C., maintaining the reaction temperature below 38° C. and continuing the esterification until the reaction mixture is substantially clear of unreacted fibers.

4. Process for the production of cellulose acetate-crotonate of relatively high crotonyl value, which comprises pretreating 100 parts by weight of cellulose with a mixture of about 100 parts by weight of glacial acetic acid and about 3 parts by weight of sulfuric acid at a temperature of about 25° C., cooling the resulting mixture to a temperature of about 7° C., adding thereto a mixture of about 300 parts by weight of crotonic anhydride and about 300 parts by weight of nitromethane cooled to about 5° C., allowing the temperature to rise to a peak temperature of about 36° C., permitting the esterification to proceed for a short period of time, then adding about 150 parts by weight of acetic anhydride cooled to about 10° C., maintaining the reaction temperature below 38° C. and continuing the esterification until the reaction mixture is substantially clear of unreacted fibers.

GEORGE W. SEYMOUR.
BLANCHE B. WHITE.
LEONARD J. ROSEN.
LEON KRUTH.

REFERENCES CITED

The following references are of record in the file of this patent:

UNITED STATES PATENTS

| Number | Name | Date |
|---|---|---|
| 2,024,658 | Murry et al. | Dec. 17, 1935 |
| 2,206,288 | Malm | July 2, 1940 |
| 2,353,423 | Tinsley | July 11, 1944 |

FOREIGN PATENTS

| Number | Country | Date |
|---|---|---|
| 471,894 | Great Britain | Sept. 13, 1937 |